Feb. 14, 1950     J. L. HACKATHORN     2,497,354
VALVE

Filed March 2, 1945

James L. Hackathorn
INVENTOR.

BY Wilfred E. Lawson
ATTORNEY.

Patented Feb. 14, 1950

2,497,354

UNITED STATES PATENT OFFICE 2,497,354

VALVE

James L. Hackathorn, Los Angeles, Calif.

Application March 2, 1945, Serial No. 580,555

1 Claim. (Cl. 251—49)

This invention relates to valves and more especially to a valve of the high pressure type, and it is primarily an object of the invention to provide a valve constructed and assembled in a manner whereby removal and replacing of packing may be accomplished while the valve is under pressure.

In the type of valves now in popular use, it is required to completely close the valve before the packing nut can be removed to permit repacking of the gland and this in turn necessitates the complete stoppage of the flow in a pipe line when the valve is leaking. This procedure often makes it necessary to shut down a whole section of a plant or laboratory. Another object of the invention is to provide a valve wherein these disadvantages are eliminated.

An additional object of the invention is to provide a valve of this kind so constructed and assembled to allow complete control of the flow therethrough by a manually operated stem and wherein the construction is such to permit the removal of the stem from the body of the valve without disturbing the packing.

A still further object of the invention is to provide a valve wherein the various parts comprised in its structure may be made of similar material, thereby eliminating the expense of carrying quantities of various stock materials and also wherein the construction and assembly of the valve is such to hold the pressure during repacking with the valve either in fully closed or fully open position and wherein the bonnet nut comprised in the assembly will not become loosened by rotation of the valve stem.

The invention consists in the details of construction and in the combination and arrangement of the several parts of my improved valve whereby certain important advantages are attained, as will be hereinafter more fully set forth.

Figure 1:
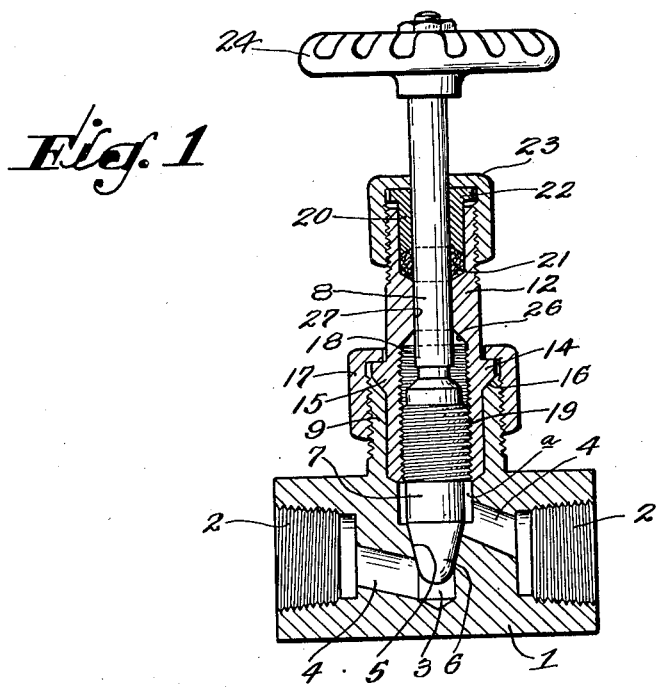
Figure 2:
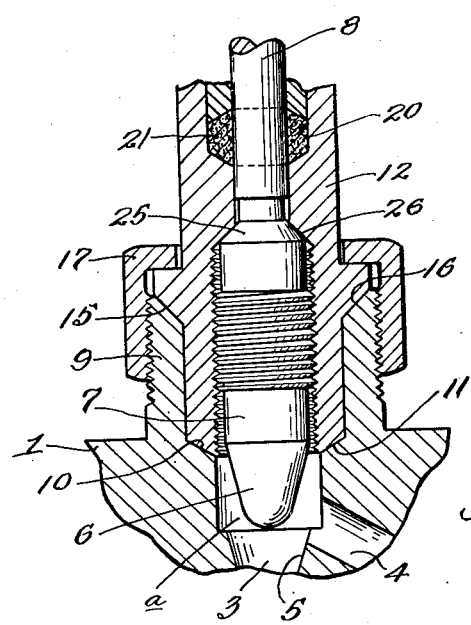

In order that my invention may be better understood, I will now proceed to describe the same with reference to the accompanying drawings, wherein:

Figure 1 is a view partly in section and partly in elevation of a valve constructed in accordance with an embodiment of my invention, the valve member being in fully closed position; and Figure 2 is an enlarged fragmentary view partly in section and partly in elevation with the valve member in fully opened position.

In the embodiment of the invention as illustrated in the accompanying drawings, the valve body 1 is elongated and is provided in its opposite end portions with the threaded sockets 2 to permit coupling therewith of the desired sections of the pipe line. The body 1 midway of the sockets 2 is provided with the transversely disposed bore 3 herein disclosed as having its longitudinal axis at right angles to the longitudinal axis of the body 1.

The sockets 2 are in communication with the inner portion of the bore 3 which extends only partially through the body 1 by the flow passages or ports 4. The ends of the ports 4 in communication with the bore 3 are offset one with respect to the other in a direction lengthwise of the bore 3 and there is provided between said ends a tapering valve seat 5 with which coacts the tapered valve member 6 which constitutes an extension at the inner or inserted end of an enlarged elongated head 7 rigid with the inner portion of an elongated valve stem 8. The valve member 6 is adapted to have close contact with the tapered seat 5 whereby flow through the body 1 may be effectively closed when desired.

The outer or open end portion $a$ of the bore 3 is enlarged and said outer or open end of the bore 3 is surrounded by an outstanding cylindrical nipple 9 having its inner surface smooth and unobstructed. The surface of the body 1 immediately surrounding the outer or open end of the portion $a$ of the bore 3 and within the area defined by the nipple 9 is formed to provide a beveled seat 10 with which is adapted to have close sealing contact the beveled outer edge 11 at the inserted end of an elongated bonnet 12.

The inserted end portion of the bonnet 12 has its periphery smooth and unobstructed for close contact with the inner surface of the nipple 9 and said bonnet 12 at a desired point intermediate its ends in surrounded with an outstanding flange 14 having its inner or under face 15 beveled for close contact with the beveled outer edge face 16 of the nipple 9. The beveled face 15 of the flange 14 is so spaced from the beveled edge 11 of the bonnet 12 to cause both of such bevels to have requisite close contact with the seat 10 and beveled edge face 16 respectively.

The outer portion of the nipple 9 is exteriorly threaded to allow the desired engagement therewith of a bonnet nut 17 which freely surrounds the bonnet 12 and has contact from without with the flange 14 whereby the bonnet 12 is securely maintained in effective applied position yet in a manner to permit withdrawal of the bonnet 12 when desired. The bonnet 12 is tubular and the inner or inserted end portion 18 of such bore is enlarged and in such enlarged portion 18 threads, as at 19, the head 7 of the stem 8. This enlarged portion 18 of the bore of the bonnet 12 is of such length as to allow the valve member 6 to be retracted into fully opened position with respect to the passages or ports 4 of the body 1.

The outer portion of the bore of the bonnet 12 is also enlarged as at 20 to provide a stuffing box for the packing 21 surrounding the stem 8 which extends through the bore of the bonnet 12. Freely but snugly extending into the enlargement 20 for conventional coaction with the packing 21 is a gland 22 and the requisite pressure is imposed on the packing 21 through the medium of the gland 22 by the packing nut 23 threading upon the outer end portion of the bonnet 12 and freely surrounding the stem 8.

The stem 8 may be rotated in any desired manner but, as herein disclosed, the outer end portion thereof has suitably secured thereto a conventional operating wheel 24.

When the packing 21 becomes worn, the stem 8 is turned in a direction to bring the valve member 6 into fully opened position and also to bring the tapered valve face 25 at the inner end of the head 7 into close contact with the tapered valve seat 26 at the inner end of the enlarged portion 18 of the bore of the bonnet 12, resulting in a tight seal, preventing any leakage out through the bonnet 12. The nut 23 can then be removed, together with the gland 22 and the worn packing 21. After new packing has been installed, the removed parts can be reassembled and the valve is again in condition for use.

The portion 27 of the bore of the bonnet 12 between the enlarged portions 18 and 20 is of a diameter to snugly but freely receive the stem 8.

It is also to be noted that if for any reason it should be desired to entirely remove the stem 8, together with its head 7 and valve member 6, the packing 21 need not be disturbed as all that will be required is to remove the bonnet nut 17, whereupon the bonnet 12, together with the stem 8 and its parts, can be readily removed as a unit and likewise returned into applied or working assembly.

It is also believed to be apparent that the coaction of the beveled face 15 of the flange 14 with the beveled edge face 16 of the nipple 9 provides means to seal against leakage in addition to the seal afforded by the coaction of the beveled edge face 19 of the bonnet 12 with the seat 11.

From the foregoing description it is thought to be obvious that a valve constructed in accordance with my invention is particularly well adapted for use by reason of the convenience and facility with which it may be assembled and operated.

What is claimed is:

A valve structure of the character stated, comprising a body having a fluid passage therethrough and a valve seat intermediate the ends of the passage, a relatively long nipple integral with the body and opening inwardly into the passage and toward said seat, the nipple having a smooth inside wall surface and an inside shoulder adjacent to its inner end forming a sealing surface, an annular sealing surface formed at the outer end of the nipple, a relatively long bonnet having an axial bore therethrough, a shoulder encircling the bonnet adjacent to one end and formed to provide a sealing face, the bonnet at the inner end being formed to provide an annular sealing face, the portion of the bonnet between the shoulder sealing face and the last mentioned sealing face lying within the nipple and snugly engaging said inner wall surface, the bonnet sealing faces each tightly engaging a nipple sealing surface, means secured to the nipple and engaging the shoulder to maintain said bonnet sealing faces against the nipple sealing surfaces, a valve stem extending through the bonnet, a valve upon the inner end of the stem for engagement with the body valve seat, a threaded coupling between the stem and the bonnet for effecting axial movement of the stem upon rotation thereof, a packing between the stem and the outer end of the bonnet, said threaded portion of the stem being of enlarged diameter, the portion of the stem which is of enlarged diameter having that end remote from the valve end of the stem formed to provide an encircling tapering sealing face, and the bore of the bonnet being formed to provide a tapering sealing seat around the stem, said tapering sealing face being adapted to tightly contact the tapering sealing seat when the stem is axially shifted to a predetermined extent outwardly in the opening of the valve.

JAMES L. HACKATHORN.

REFERENCES CITED

The following references are of record in the file of this patent:

UNITED STATES PATENTS

| Number | Name | Date |
| --- | --- | --- |
| 852,819 | Brick | May 7, 1907 |
| 935,597 | Frost | Sept. 28, 1909 |
| 1,151,494 | Marsh | Aug. 24, 1915 |
| 1,167,027 | Stephenson | Jan. 4, 1916 |
| 1,779,740 | Kehl | Oct. 28, 1930 |
| 1,799,025 | Schrader | Mar. 31, 1931 |

FOREIGN PATENTS

| Number | Country | Date |
| --- | --- | --- |
| 80,320 | Germany | 1895 |
| 527,074 | France | 1921 |